May 11, 1926.
R. W. HERRICK
1,584,171
APPARATUS FOR MOLDING LOCK SLOTS OF BAYONET LOCKS
Filed July 15, 1924  6 Sheets-Sheet 3
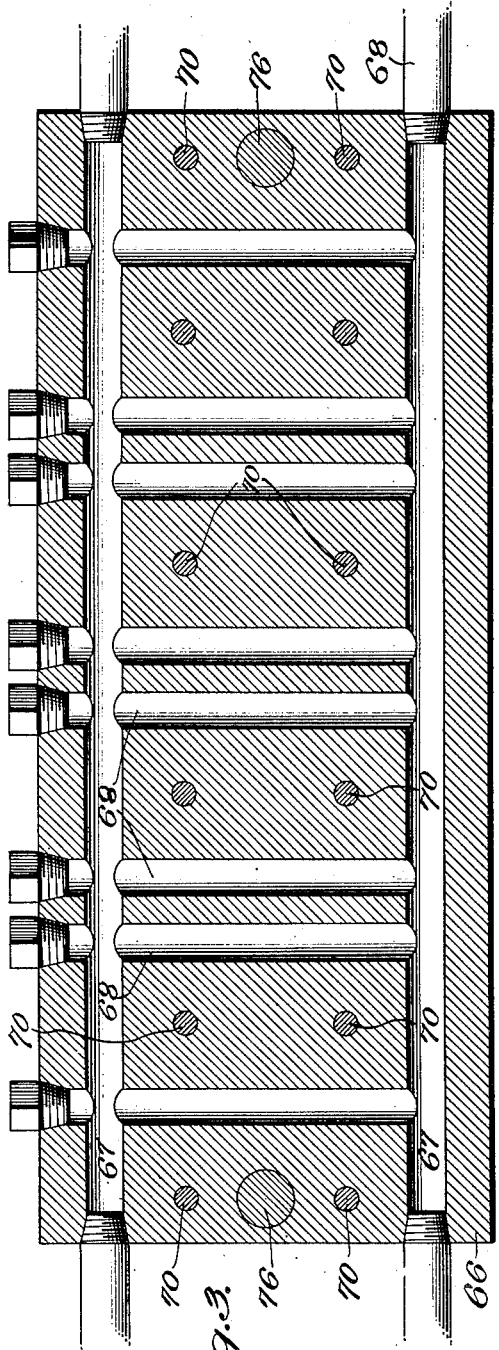
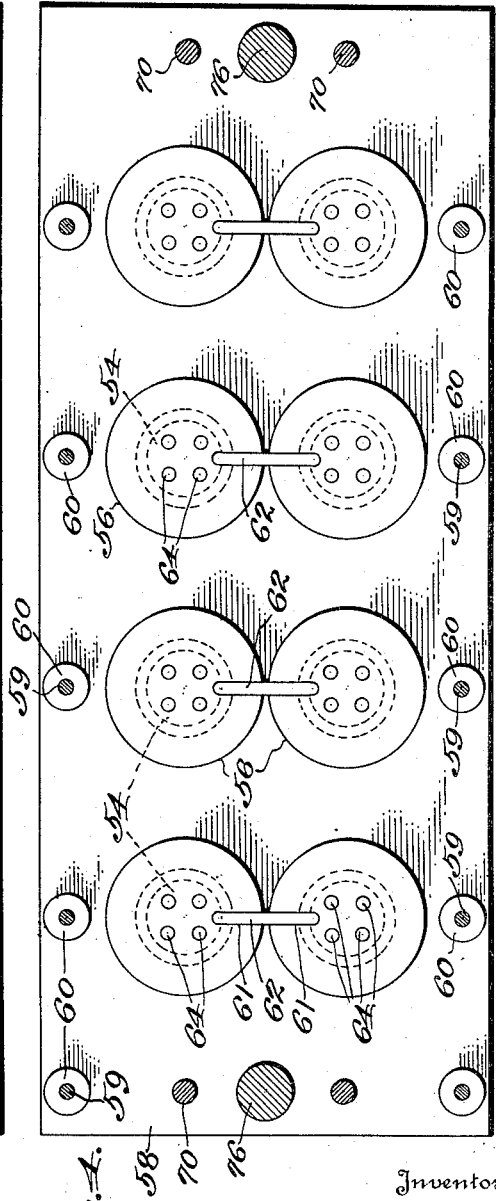
Inventor
Roy W. Herrick,
By
Attorney

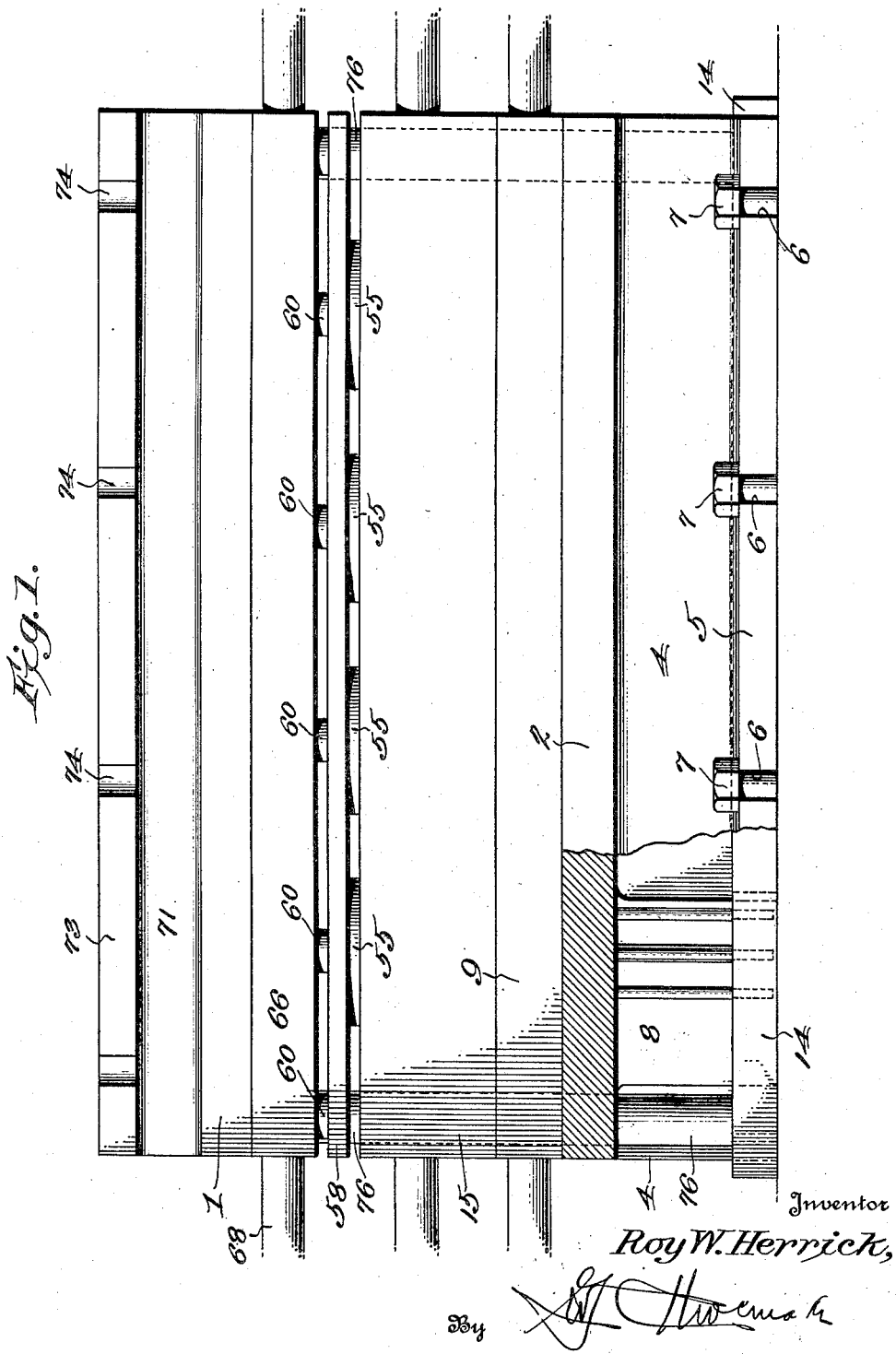

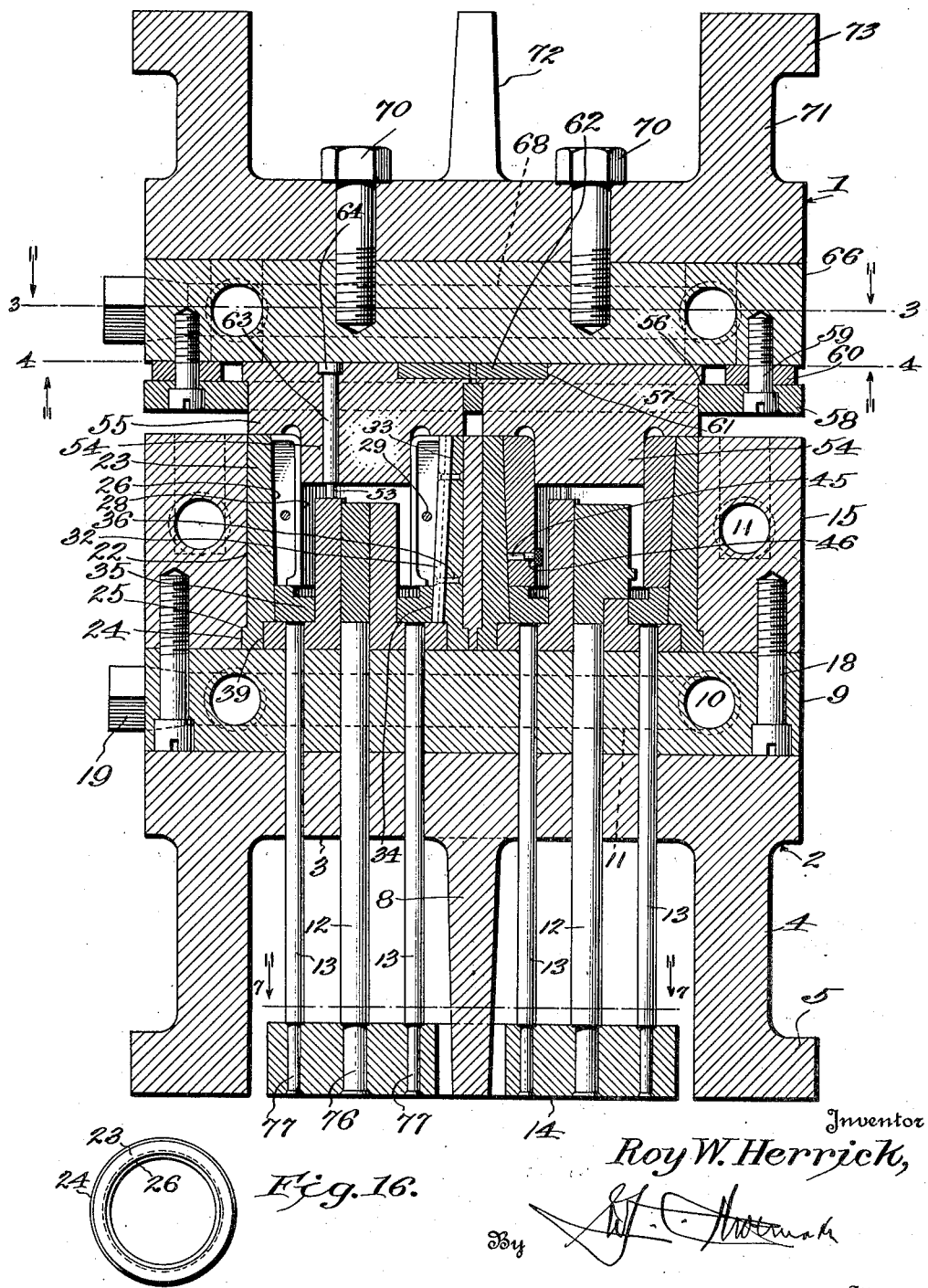

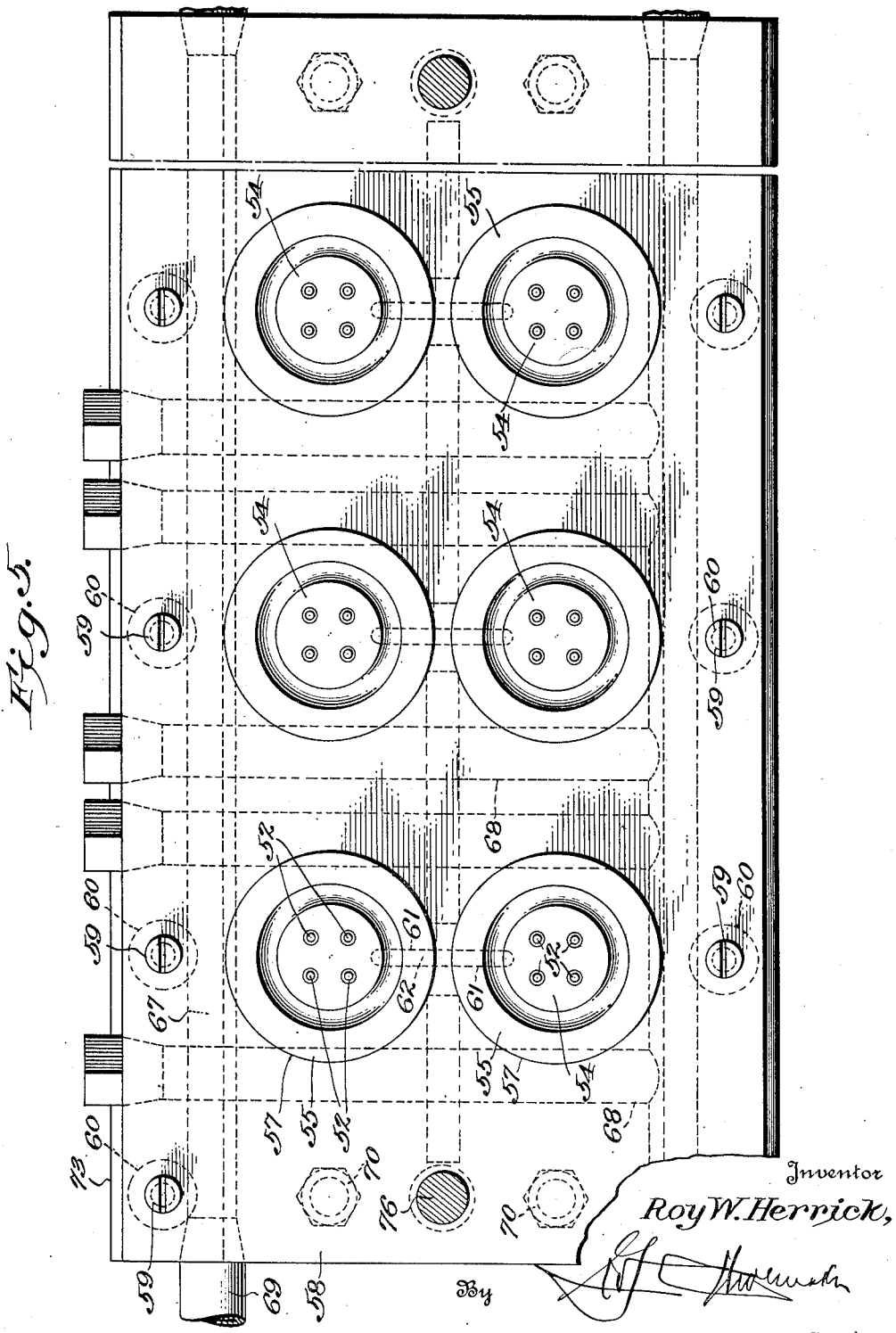

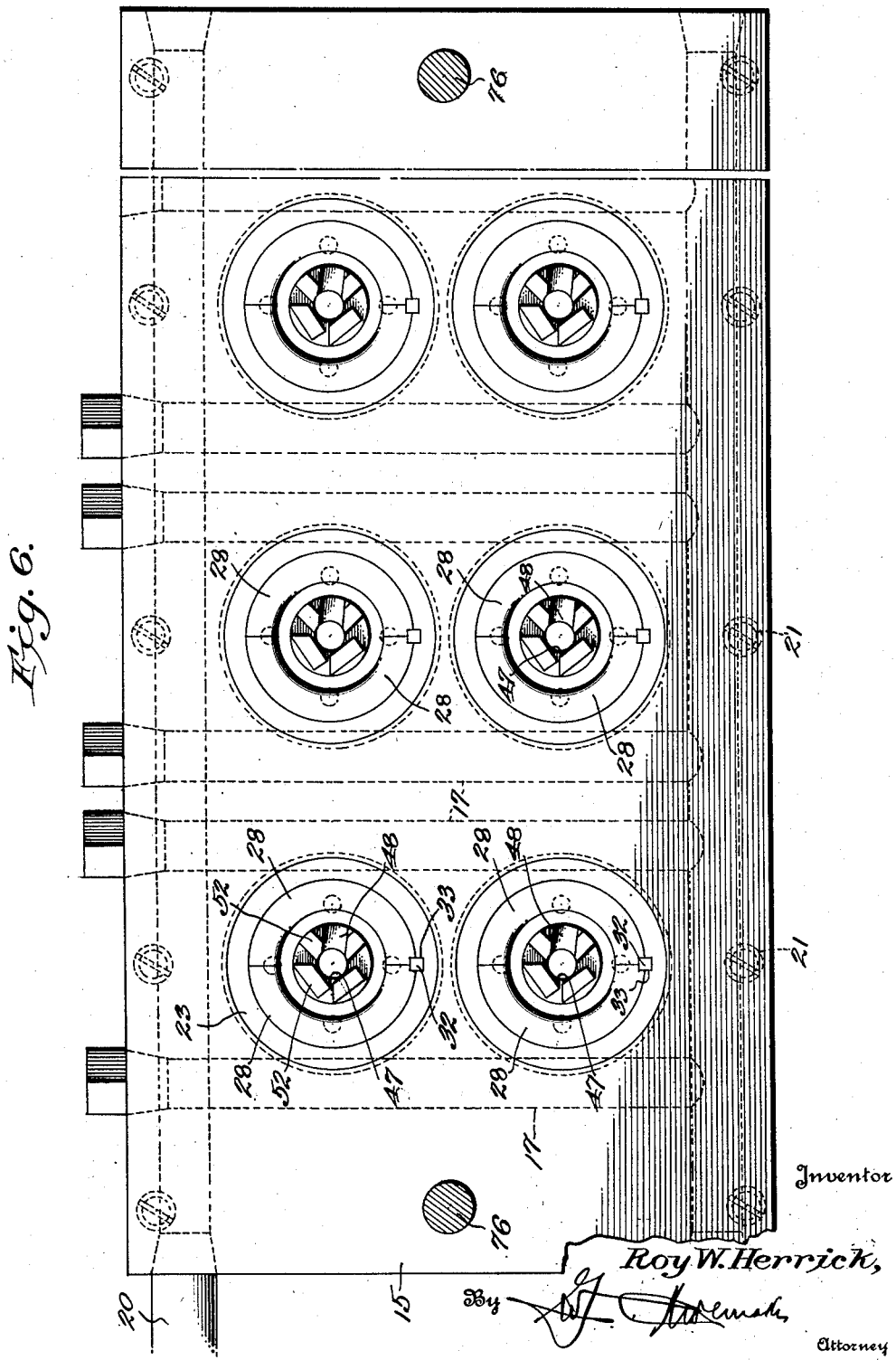

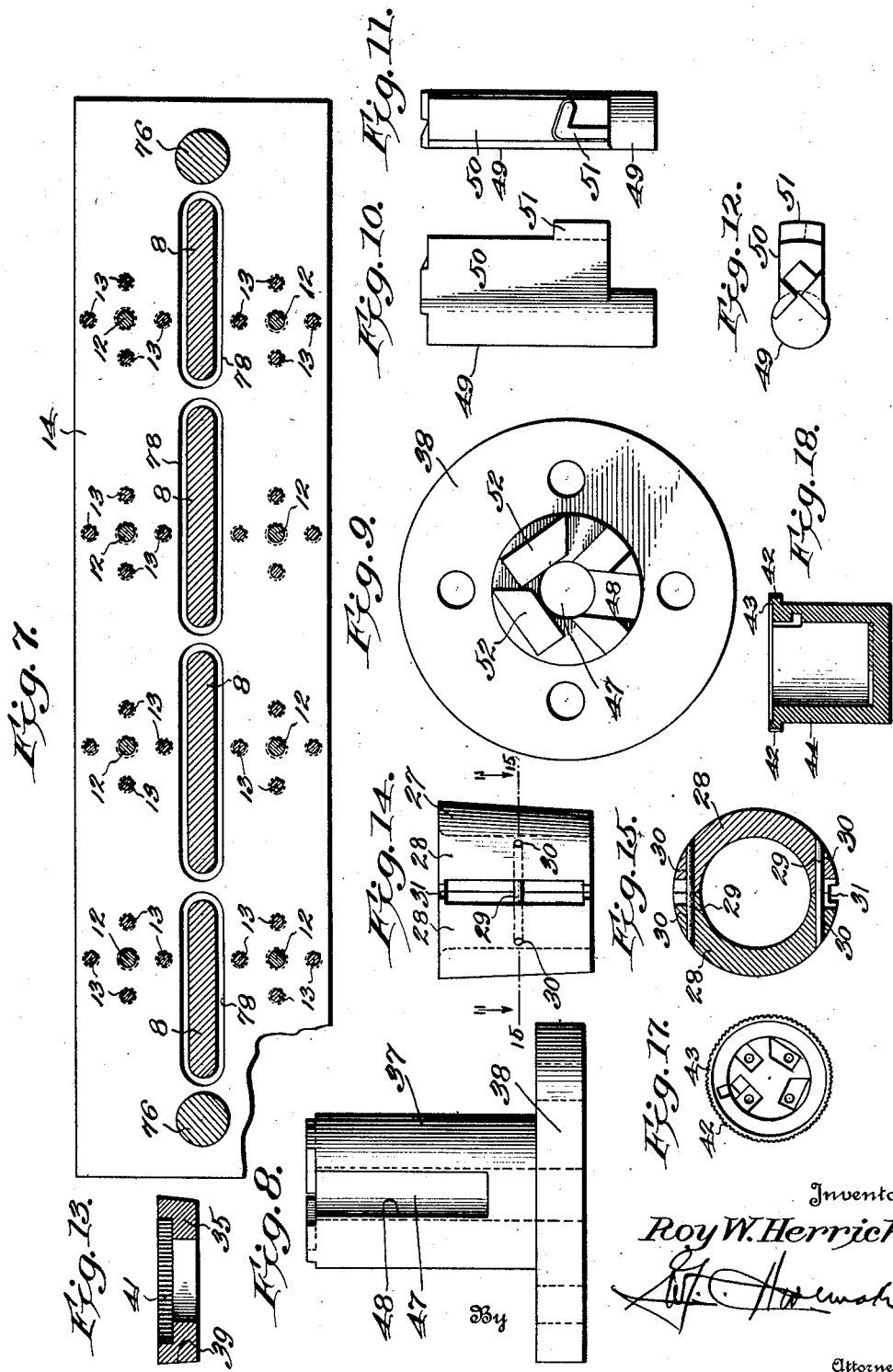

Patented May 11, 1926.

1,584,171

UNITED STATES PATENT OFFICE.

ROY W. HERRICK, OF JACKSON, MICHIGAN.

APPARATUS FOR MOLDING LOCK SLOTS OF BAYONET LOCKS.

Application filed July 15, 1924. Serial No. 726,187.

The invention relates to a method of and apparatus for molding lock slots of bayonet locks for adapters and receptacles for radio tubes.

The object of the present invention is to simplify and improve the method and means for molding adapters and the like for radio tubes and to enable adapters and tube receptacles of this character to be easily and perfectly molded from bakelite with an L-shaped slot on the interior of the ring portion and also to enable the desired pressure to be applied to the material during molding thereof and the completed article after molding to be readily removed without injury to the same.

With these and other objects in view, the invention consists in the novel method, construction and novel combination and arrangemet of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a side elevation of a molding apparatus constructed in accordance with this invention.

Figure 2 is a vertical sectional view of the same.

Figure 3 is a horizontal sectional view on the line 3—3 of Figure 2.

Figure 4 is a similar view on the line 4—4 of Fig. 2.

Figure 5 is a reverse plan view of the upper movable punching section of the mold.

Figure 6 is a plan view of the lower die section of the mold.

Figure 7 is a horizontal sectional view on the line 7—7 of Fig. 2.

Figure 8 is a side elevation of the center post or core section of the mold.

Figure 9 is a plan view of the same.

Figure 10 is a side elevation of the removable die member of the center post or cross section.

Figure 11 is an end elevation of the same.

Figure 12 is a plan view of the die section shown in Figures 10 and 11.

Figure 13 is a detail sectional view of the bottom member of the die section.

Figure 14 is a side elevation of the sectional wall member of the lower dies section.

Figure 15 is a detail horizontal sectional view taken on the line 15—15 of Fig. 14.

Figure 16 is a plan view of the shell of the die.

Figure 17 is a plan view of the adapter.

Figure 18 is a vertical sectional view of the same.

In the accompanying drawings in which is illustrated the preferred embodiment of the invention, an eight unit bakelite mold is shown. The mold comprises in its construction, a lower die section and an upper movable punch section which is connected to and actuated by a hydraulic press to enable the required pressure to be applied to the bakelite or other material in the molding of the same.

The upper or movable punch section is carried by a top frame 1 for attachment to the upper platen of the hydraulic press and the lower or die section of the mold is mounted upon a base 2 comprising a horizontal top 3 and vertical sides 4 having bottom flanges 5 provided at intervals with notches 6 for the reception of bolts 7 or other suitable fastening devices for securing the base to the lower platen of a hydraulic press. The base 2 is also reinforced between the side walls by a centrally aligned series of depending webs 8 arranged at intervals throughout the length of the base as clearly illustrated in Figs. 2 and 7 of the drawings. Mounted upon the base 2 is a bottom radiator 9 constituting a bottom heating plate and provided at opposite sides with longitudinal passages 10 and at intervals with transverse connecting passages 11, which are spaced apart as clearly indicated in Fig. 6 of the drawings to provide spaces for knock-out rods 12 and 13 of a vertically movable stripper plate 14. The bottom radiator 9 is oblong and it forms a support for the die portions of the mold and also for an intermediate radiator 15 provided with longitudinal side passages 16 and transverse connecting passages 17 arranged at the end portions of the intermediate radiator 15 and at points between the molds. The intermediate and bottom radiators are secured together by vertical bolts 18 piercing the bottom radiator from the lower face thereof and engaging threaded openings in the lower face of the intermediate radiator and having their heads counter-sunk in the lower face of the bottom radiator as clearly shown in Fig. 2 of the drawings. The bottom and intermediate radiators are connected with suitable pipes 19 and 20. The lower radiator 9 is also provided at intervals with suitable perforations for the reception of fastening devices 21, for securing the lower radiator to the base 2.

The intermediate and bottom radiator form a lower heating and cooling element and the said intermediate radiator is provided at intervals with cylindrical openings 22, arranged in pairs as clearly shown in Fig. 6 of the drawings, and adapted to contain the die portions of the mold elements, as clearly shown in Fig. 2 of the drawing. Each of the openings in the intermediate radiator receives an outer cylindrical shell 23 provided at the bottom with an exterior annular shoulder or collar 24, which fits in an annular recess or enlargement 25 of the opening 22 whereby the outer shell of the mold is retained firmly in position and held against upward movement when the stripper plate is operated as hereinafter fully described. The cylindrical shell 23 is preferably constructed of a single piece and it has an interior taper as clearly shown at 26 in Fig. 2 of the drawings, the taper being downwardly to free the sectional wall member 27 of the mold in the upward movement of the said wall member during the stripping action. The wall member which is approximately cylindrical is composed of two similar sections 28, which are connected at opposite sides when assembled by horizontal pins 29 arranged in registering perforations 30 as clearly illustrated in Fig. 15 of the drawings. The sections 28 are recessed at one side beyond the adjacent pin 29 to form a substantially vertical key-seat 31, for the reception of a key 32 for interlocking the wall member of the mold with the said shell.

The shell is provided at one side with an inner approximately vertical recess 33 for the reception of the key 32 which also extends below the wall section and engages a notch 34 in a bottom member 35. The key 32 which is preferably secured permanently to the shell by rivets 36 or other suitable fastening devices may be applied in any other desired manner as will be readily understood and it maintains the members of the die portion of the mold in proper assembled relation and prevents any accidental relative rotary movement of the parts. The bottom member 35 is in the form of a ring, as clearly shown in Fig. 13 of the drawings and it is arranged upon a cylindrical center-post or cross section 37 provided with an annular base flange 38 which fits in an annular recess 39 in the lower end of the mold shell whereby the core section or center post is interlocked with the said shell and is retained by the same on the lower radiator and held against upward movement during the removal of the completed adapter from the mold.

The annular bottom member is provided in its upper face with an annular recess 40 and it has notches 41 in the vertical wall thereof adapted to form the notches 42 in the flange portion 43 of the adapter 44. The wall member 27, which is seated upon the bottom member 37, projects inward over the upwardly extending portion of the bottom member and cooperates with the bottom member to form the exterior flange 43 of the adapter. One of the sections 28 of the wall member 27 is provided with a horizontal perforation 45 adapted to receive a projecting portion 46 of a metal insert 46ª which is embedded in the adapter during the molding operation thereof. The projecting portion 46 of the metal insert is placed in position prior to the introduction of the material into the lower die portion of the mold and the material is molded around the insert which projects from the adapter after the molding operation of the latter has been completed.

The central post or core section 37 is provided with a central vertical opening 47 and it has a slot 48 in its upper portion extending from the vertical opening 47 to the outside of the post as clearly shown in Figs 8 and 9 of the drawings and the opening 47 and the slot 48 are adapted to receive a removable die member 49 corresponding in configuration to the opening 47 and to the slot 48. The opening 47 is preferably round and the inner portion of the die member is cylindrical to conform to the opening 47 and the said die member has a vertical extension 50 arranged in the slot 48 and provided with an exteriorly projecting approximately L-shaped lug or portion 51, which forms the lock slot of the bayonet lock joint in the inner face of the ring portion of the adapter. The lug or projecting portion 51 consists of a vertical flange and an inclined flange extending downwardly and laterally from the upper end of the vertical flange as clearly shown in Fig. 11 of the drawing. This provides an approximately inverted L-shaped lug or flange which is embedded in the material of the adapter to form the bayonet slot. The bayonet slot is designed to receive the lug of the radio tube to enable the same to be introduced into the adapter in proper position and the tube is also locked in such position. In the final movement of the tube which is a partial rotary movement, its lug or projection is carried downwardly in the inclined portion of the slot in the adapter so that it will properly contact with the terminals or contacts of the adapter when properly seated therein. The die member 49 which extends below the lower end of the slot 48, is maintained in proper position during the molding operation by means of the opening 47 and the slot 48 of the center post or core member and it is slidable upwardly with the molded adapter when the same is removed from the mold as hereinafter fully explained. The center post or core member 37 is provided at the top with spaced lugs 52 adapted to form seats in the end wall of the adapter for the reception of the metal contacts thereof. These top lugs 52 also form abutment or anvil faces to cooperate with punches 52 carried by plunger members 54, which extend into the cup shaped dies of the lower half of the mold in the molding operation. The cylindrical wall member 27 and the cooperating bottom member 35 form a substantially cup shaped mold into which the material is placed prior to the operation of the molding apparatus and the plungers 54 which carry the punches 53 are substantially cylindrical and are moved downwardly and into the cavities of the dies for compressing the material during the molding operation. The said plungers 54 which are substantially cylindrical, have enlarged upper portions 55, which have exterior shoulders 56 and which fit in circular openings 57 of a substantially oblong retaining plate 58 secured by screws 59 or other suitable fastening devices to the lower face of the upper radiator. Spacers 60 are arranged on the screws and correspond in thickness to the annular shoulders 56 of the plungers and the said shoulders are engaged by the retaining plate for clamping the upper ends or heads of the plungers firmly against the bottom of the top radiator. The plungers are arranged in pairs and they are provided at their adjacent upper enlarged portions with key seats 61 for the reception of a key 62 which extends across the space between the adjacent heads of the plungers and fits in the said key seats. The keys 62, which consist preferably of straight pieces, lock the plungers against rotary movement and maintain them in proper relative position so that the punches will be properly positioned with respect to the lugs of the center post or core member. The punches consist of pins 63 having reduced projecting portions for perforating the end wall of the adapter and provided at their upper ends with heads 64 arranged in enlarged portions or counter-bores of the openings 65 and fitted against the lower face of the top radiator 66. The top radiator 66 is rectangular and is provided with longitudinal side openings 67 and with transverse connecting passages 68 which are arranged at intervals and extend across the space between the longitudinal openings or passages 67. These passages are connected with suitable pipes 69 for supplying the temperature controlling medium to the radiator for heating the same prior to and during the molding operation and for cooling the same after the completion thereof. The top radiator is secured to the upper attaching member 1 by screws 70, which are arranged between side flanges 71 and central webs or flanges 72. The top attaching frame or member which is secured to the upper platen of the hydraulic press is constructed substantially the same as the base 2 which is secured to the lower platen of the hydraulic press. The side flanges are provided with laterally extending portions 73, which are provided at intervals with notches 74 for the reception of bolts or other suitable fastening devices for securing the top attaching member to the top platen of the hydraulic press.

In Figure 2 of the drawings, the upper half of the mold is shown at the limit of its downward movement. In the molding operation, the upper half of the mold is elevated and the bakelite material is placed in the cup shaped dies of the lower half of the mold. While an eight unit mold is illustrated in the accompanying drawings, of course, any desired number of units may be employed.

The die portions of the mold are heated by steam which is introduced into the passages of the intermediate and bottom radiators and after the die members have been heated for a sufficient length of time, the upper half of the mold, which has also been previously heated by the introduction of steam into the upper radiator, is lowered and the material is subjected to excessive pressure from the hydraulic press which forces the material into all of the spaces and apertures of the mold and molds the adapters. After the bakelite has been subjected to the heat and pressure for the desired length of time, to complete the molding operation, the steam is cut off from the passages of the radiators and cold water is introduced into the same for cooling the mold. This causes a shrinkage of the material around the core member or center post and the molded adapters are ejected from the dies by means of the knock-out rods 12 and 13 which extend through aligned openings in the base 2, between radiator 9 and the center posts or core members. The stripper plate 14 is connected with the top frame 1, by suitable connecting rods 75 and moves upwardly with the upper platen and with the upper half of the mold. The knock-out rod 12 of each set is arranged to engage the lower end of the die member 49 and the knock-out rods 13 which are arranged in sets of four as clearly indicated in Fig. 7 of the drawings, engage the lower face of the annular bottom member 35 and move the same upwardly, carrying with it the wall member 37, the die member 49 being simultaneously carried upwardly by the knock-out rod 12. This operation removes from the cylindrical shell of the mold, the wall member, the bottom member, the die 49 and the molded adapter and thereby prevents any rupture of the material of the adapter in removing the same from the mold. Rupture of the material would necessarily result unless the said parts were carried simultaneously out of the mold with the removal of the adapter. After the adapter has been removed from the mold, the sections of the wall member 28 are separated and the die member 49 is removed from the adapter. The parts are then replaced in the shell and in the center post and the operation of molding is again performed by first heating the upper and lower halves of the mold to the proper temperature and then placing the material in the dies and operating the hydraulic pressure after the material has been heated and is in condition for molding. The top, intermediate and bottom radiators which operate as heating elements also serve as cooling elements. Any suitable means may of course, be employed for introducing the steam and cold water into the radiators as will be readily understood. The knock-out rods have their lower terminal portions 76 and 77 reduced to fit in openings in the stripper plate 14 and the reduced terminal portions 76 and 77 form shoulders to fit against the upper face of the stripper plate and the lower ends of the reduced portions 76 and 77 are headed by being peened in countersunk openings in the lower face of the stripper plate. The stripper plate is provided with a series of aligned openings 78 through which extend the webs 8 of the lower attaching member so as not to interfere with the vertical movement of the stripper plate.

What is claimed is:

1. A molding apparatus of the class described including upper and lower attachment members having means for securing them to the upper and lower platens of a press, a plurality of dies supported by the lower attachment member, plungers carried by the upper attachment member for exerting pressure on material in the dies, a stripper plate located beneath the dies and housed within the lower attachment member and connected with and carried by the upper attachment member for upward and downward movement simultaneously with the upper platen of the press, and knockout rods carried by the stripper plate and extending into the said dies for ejecting the molded material.

2. A molding apparatus of the class described including upper and lower relatively movable attachment members having means for securing them to the upper and lower platens of a press, upper and lower horizontal radiators mounted on the attachment members, an intermediate horizontal radiator of approximately the same size as the lower radiator and mounted thereon, and provided with dies adapted to receive the material to be molded, plungers mounted on the upper radiator and arranged to extend into the dies for compressing material, and a vertically movable stripper plate located beneath the dies and housed within the lower attachment member and provided with knockout rods extending through the lower attachment member into the dies for ejecting molded material therefrom.

3. A molding apparatus of the class described, including an approximately cup-shaped die adapted to receive the molded material and comprising an outer shell, a central core member having a base, a bottom member arranged upon said base and surrounding the core member, a sectional wall member supported upon the bottom member and means for compressing the molded material in the die.

4. A molding apparatus of the class described including an approximately cup-shaped die adapted to receive the molded material and comprising an outer shell, a central core member having a base interlocked with the shell, a bottom member arranged upon the said base and surrounding the core member, a sectional wall member supported upon the bottom member, a removable die member mounted in the core and having a projecting portion for forming a lock slot interiorly of the molded material, means for compressing the molded material in the die and ejecting means located at the bottom of the die and engaging the bottom member and the removable die member.

5. A molding apparatus of the class described including a lower die comprising a wall member composed of sections and provided with pins arranged in openings of the sections and detachably connecting the same, said sections being recessed at adjacent edges to form a key seat, an outer shell receiving the wall member and provided with a key engaging the said key seat, a core extending into the wall member at the bottom thereof, a bottom member surrounding the core, a removable die member mounted in the core and projecting laterally from the same for molding on the interior of the material and a plunger movable into and out of the die for compressing the material therein.

6. A molding apparatus of the class described including upper and lower attachment members having means for securing them to the upper and lower platens of a press, the lower attachment member presenting a horizontal upper face and provided at opposite sides with flanges extending downwardly from the said upper face, a plurality of dies carried by the lower attachment member, plungers mounted on the upper attachment member for exerting pressure on material in the said dies, a stripper plate located between the said flanges of the lower attachment member and housed within the latter and connected with and carried by the upper attachment member, and knock-out rods mounted on the stripper plate and extending into the said dies for ejecting the molded material therefrom.

In testimony whereof I have hereunto set my hand.

ROY W. HERRICK.